United States Patent
Kaimal et al.

(10) Patent No.: US 11,287,597 B2
(45) Date of Patent: Mar. 29, 2022

(54) APPARATUS AND METHODS FOR MARKING OPTICAL FIBERS USING AN INK STREAM

(71) Applicant: CORNING INCORPORATED, Corning, NY (US)

(72) Inventors: Aditya Kaimal, Wilmington, NC (US); Kelvin Nguyen, Fort Worth, TX (US); Krishna Prasad Ambuga Keshavamurthy, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 254 days.

(21) Appl. No.: 16/715,234

(22) Filed: Dec. 16, 2019

(65) Prior Publication Data
US 2020/0215825 A1   Jul. 9, 2020

Related U.S. Application Data

(60) Provisional application No. 62/790,135, filed on Jan. 9, 2019.

(51) Int. Cl.
| | |
|---|---|
| *B41J 3/407* | (2006.01) |
| *G02B 6/44* | (2006.01) |
| *H01B 13/34* | (2006.01) |

(52) U.S. Cl.
CPC .......... *G02B 6/4482* (2013.01); *B41J 3/4073* (2013.01); *H01B 13/341* (2013.01); *H01B 13/345* (2013.01)

(58) Field of Classification Search
CPC .... B41J 3/4073; G02B 6/4482; H01B 13/341; H01B 13/345
See application file for complete search history.

(56) References Cited

U.S. PATENT DOCUMENTS

| | | |
|---|---|---|
| 2,929,136 A | 3/1960 | Andren |
| 3,021,815 A | 2/1962 | Burke et al. |
| (Continued) | | |

FOREIGN PATENT DOCUMENTS

| | | |
|---|---|---|
| DE | 3208172 A1 | 9/1983 |
| JP | 09171726 A | 6/1997 |
| (Continued) | | |

OTHER PUBLICATIONS

International Search Report and Written Opinion of the International Searching Authority; PCT/US2020/012332; dated Apr. 23, 2020; 12 Pages; European Patent Office.

*Primary Examiner* — Henok D Legesse
(74) *Attorney, Agent, or Firm* — Kevin L. Bray

(57) ABSTRACT

A method of marking an optical fiber is disclosed, wherein the method includes forming an ink stream, moving an optical fiber over a fiber path that resides adjacent the ink stream, and periodically changing the position of the fiber path so that the optical fiber at least partially enters the ink stream so that the ink from the ink stream forms spaced apart marks on the outer surface of the optical fiber. An optical fiber marking apparatus is also disclosed that includes payout and take modules that move the optical fiber over the fiber path, a marking unit configured to form an ink stream adjacent the fiber path, and a fiber positioning device that causes the optical fiber to periodically intersect the ink stream so that ink from the ink stream forms spaced apart marks on the outer surface of the optical fiber.

24 Claims, 12 Drawing Sheets

(56) References Cited

U.S. PATENT DOCUMENTS

| | | | |
|---|---|---|---|
| 3,434,456 A | | 3/1969 | Geating |
| 3,807,025 A | | 4/1974 | Gudmestad |
| 4,020,194 A | * | 4/1977 | McIntyre ............ D21H 5/0025 |
| | | | 427/172 |
| 4,619,842 A | | 10/1986 | Moss et al. |
| 4,629,285 A | | 12/1986 | Carter et al. |
| 5,119,464 A | | 6/1992 | Freychet et al. |
| 5,151,306 A | | 9/1992 | Andrews et al. |
| 5,377,292 A | | 12/1994 | Bartling et al. |
| 5,796,905 A | | 8/1998 | Hoffart et al. |
| 6,064,789 A | | 5/2000 | Mills |
| 6,404,972 B1 | | 6/2002 | Pasch et al. |
| 6,576,591 B1 | | 6/2003 | Snowdon et al. |
| 6,650,815 B2 | | 11/2003 | Hawtof et al. |
| 7,072,554 B2 | | 7/2006 | Watanabe et al. |
| 8,768,128 B1 | | 7/2014 | Garner et al. |
| 2015/0352861 A1 | | 12/2015 | Yagi et al. |
| 2016/0299310 A1 | * | 10/2016 | Kaneko ................... G02B 6/44 |

FOREIGN PATENT DOCUMENTS

| | | | | | |
|---|---|---|---|---|---|
| JP | 11326714 A | | 11/1999 | | |
| JP | 2004157193 A | | 6/2004 | | |
| JP | 2016206211 A | | 12/2016 | | |
| JP | WO2018123743 | * | 7/2018 | ............... | G02B 6/44 |
| WO | 2001/046738 A1 | | 6/2001 | | |

* cited by examiner

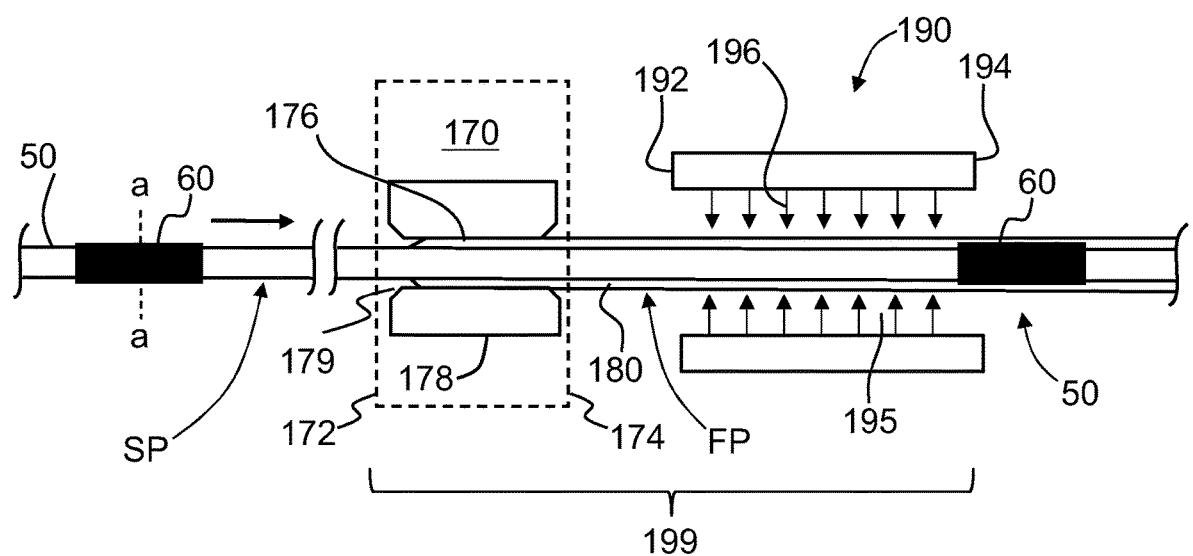
FIG. 4
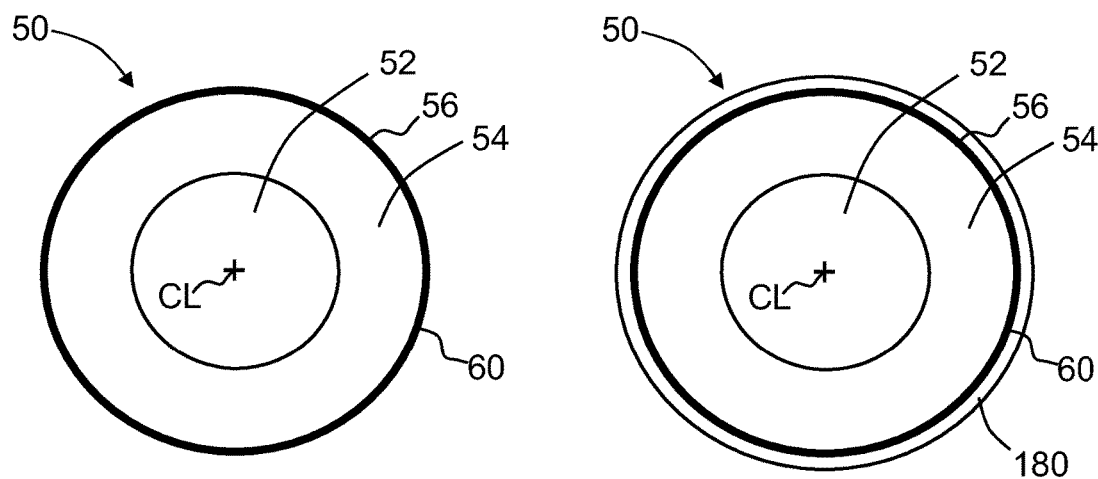
FIG. 5  FIG. 6

APPARATUS AND METHODS FOR MARKING OPTICAL FIBERS USING AN INK STREAM

This application claims the benefit of priority to U.S. Provisional Application Ser. No. 62/790,135 filed on Jan. 9, 2019, the content of which is relied upon and incorporated herein by reference in its entirety.

FIELD

The present disclosure relates to optical fibers, and in particular relates to apparatus and methods for marking of optical fibers using an ink stream.

BACKGROUND

Optical fiber cables are used extensively in optical telecommunications systems. Certain types of optical fiber cables used for transmitting large amounts of data include many individual optical fibers, with the fiber count ranging from just a few to hundreds, depending on the particular application. A coding scheme can be employed so that the individual optical fibers can be identified. Such coding schemes can include fiber color or individualized markings on the outer surface of the optical fibers.

A problem with color-based coding schemes is that there are not enough colors for effectively color coding more than about eighteen optical fibers. A problem with marking the outer surface of optical fibers is that the present-day methods and apparatus used to perform the marking need to be relatively slow to obtain high-quality marks, i.e., marks without gaps, missing material, uneven marking, etc. This is particularly true when trying to mark optical fibers using an inkjet from an inkjet printer head.

SUMMARY

The apparatus and methods disclosed herein generally include moving an optical fiber over a fiber path that includes a marking location defined by a marking unit. The marking unit is configured to dispense marking material in the form of a stream of marking material, referred to herein generally as an ink stream. Marks are produced on the optical fiber by periodically adjusting the fiber path (i.e., the position of the optical fiber) so that it at least partially passes into the ink stream for a short time duration so that the ink from the ink stream coats a select axial length of the optical fiber over at least a portion of its outer surface as the optical fiber moves over the fiber path. In an example, the marks are ring marks that cover the circumference of the optical fiber. Also in an example, fiber positioning device (e.g., a roller) having a position adjustment feature (e.g., a protrusion, an eccentric portion, etc.) is used to move the fiber path into the ink stream, with the configuration of the fiber positioning device defining the axial length of the mark as well as the spacing between adjacent marks. Different colored inks can be used to form the ink stream to provide additional visibility and/or for identification purposes without modifying the optical fiber transmission characteristics. The marked optical fiber can then be further processed, e.g., the marks can be dried and then a protective overcoat added to protect the marks from wear and tear. The protective overcoat can be transparent and colored (tinted) to provide additional visibility and/or for identification. The marking systems and methods can be applied directly after drawing the optical fiber or later in the process of defining the final form of the optical fiber.

In various examples, the marking systems and methods disclosed herein enable the speed of the optical fiber over the optical path (i.e., the fiber speed or line speed) to be relatively high, e.g., greater than 10 meters per second (m/s) or greater than 20 m/s or greater than 30 m/s or greater than 40 m/s or greater than 50 m/s.

Because the ink stream is continuous, the process window for forming marks is much larger than for inkjet printing of marks because there is no need to control or direct ink droplets from an inkjet printer head onto the outer surface of the optical fiber. In addition, the quality of the marks is generally better than those obtained using inkjet-based marking. The use of an ink stream allows for many different types of inks to be used, including those having a relatively wide range of viscosities.

An embodiment of the disclosure is directed to a method of marking an optical fiber having an outer surface. The method comprises: forming from ink an ink stream; moving an optical fiber over a fiber path that resides adjacent the ink stream; and periodically changing the position of the fiber path so that the optical fiber at least partially enters the ink stream so that the ink forms spaced apart marks on the outer surface of the optical fiber.

Another embodiment of the disclosure is directed to a method of marking an optical fiber. The method comprises: causing the optical fiber to move over a fiber path, wherein the moving optical fiber has an outer surface; forming on the moving optical fiber a select number density of wet ink marks per unit length on the outer surface of the optical fiber by periodically moving the fiber path so that it periodically intersects an ink stream; drying the wet ink marks at a drying location to form dried ink marks; and applying a substantially transparent protective coating over the dried ink marks and the outer surface of the moving optical fiber, wherein the dried ink marks are visible through the substantially transparent protective coating.

Another embodiment of the disclosure is directed to an optical fiber marking apparatus for marking an optical fiber having an outer surface, comprising relative to a fiber path: a payout module and a take-up module respectively configured to pay out and take up the optical fiber while moving the optical fiber over the fiber path at a fiber speed; a marking unit disposed downstream of the payout module and at a marking location, the marking unit configured to form an ink stream adjacent the fiber path; and a fiber positioning device operably disposed relative to the marking unit and that is adapted to periodically position the optical fiber to intersect the ink stream so that ink from the ink stream forms spaced apart marks on the outer surface of the optical fiber at the marking location.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures, in which:

FIG. 4 is a close-up view of the portion of the optical fiber marking apparatus that includes an overcoat applicator and a curing system that together define an overcoating system.

FIG. 5 is a cross-sectional view of the marked but uncoated optical fiber as taken along the line a-a in FIG. 4 at a location of a mark.

FIG. 6 is similar to FIG. 5 and illustrates the marked optical fiber with a protective overcoat.

DETAILED DESCRIPTION

Figure 1A:
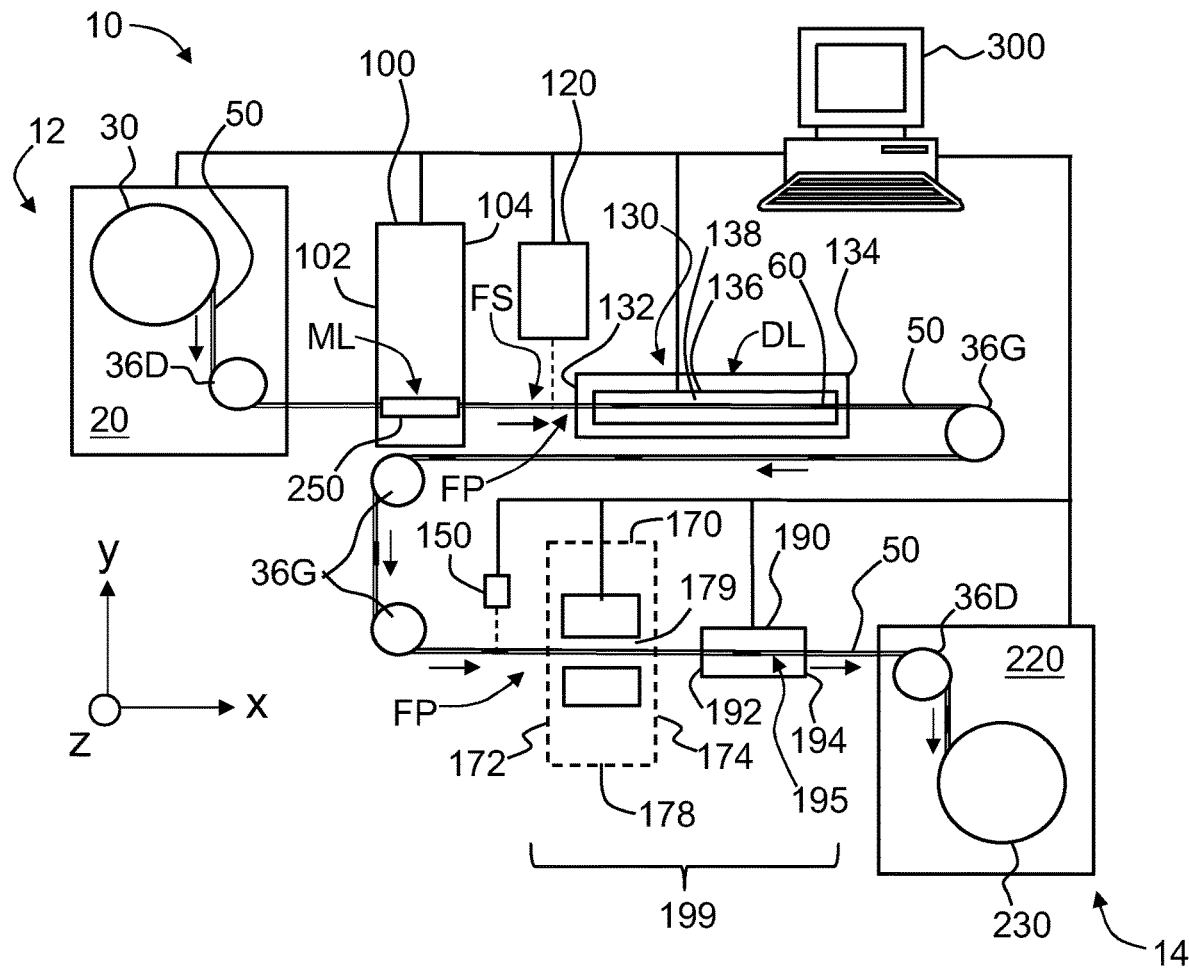
FIG. 1A is a schematic diagram of an example high-speed optical fiber marking apparatus for marking an optical fiber as disclosed herein.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

Likewise, relative terms like top, bottom, side, horizontal, vertical, etc. are used for convenience and ease of explanation and are not intended to be limiting as to direction or orientation. In some cases, the term "vertical" means aligned with the direction of gravity and the term "horizontal" means in a plane perpendicular to vertical.

The terms "downstream" and "upstream" are used herein to indicate positions relative to the direction of the movement of the optical fiber over a fiber path through the high-speed optical fiber marking apparatus as described below. Thus, an apparatus component B that is downstream (upstream) of an apparatus component A processes a given section of the optical fiber after (before) it is processed by the apparatus component A.

The number density of marks is denoted as N and is the number of marks per unit length, and is given as the number of marks per meter (m) unless stated otherwise.

The abbreviation "μm" is used to denote "micron" or "micrometer," with the abbreviation "nm" is used to denote "nanometer."

The "fiber speed" is denoted by SF and is the speed at which the optical fiber moves over the fiber path through the high-speed optical fiber marking apparatus, and is also referred to as the "line speed."

The term "ink" used herein as shorthand for any liquid material that can be formed into a stream and that can be used to form a mark on the outer surface of an optical fiber.

The term "mark" as used herein is used to denote any type of simple indicia formed on an outer surface of the optical fiber over an axial mark length LM using the ink.

The term "ink stream" means a flow of ink (as defined above), wherein the flow is continuous for at least an amount of time sufficient for the optical fiber being marked to be deflected from its normal or nominal path into the flow to at least partially enter the flow, and then to leave the flow to return to its normal or nominal path. In an example, the ink stream is already established and flowing past the optical fiber when the optical fiber is moving toward the ink stream and continues flowing until after the optical fiber has exited the ink stream. In one example, the ink stream flow is continuous for at least the time for two incursions of the optical fiber into the ink stream to form at least two marks. In another example, the flow of the ink stream is continuous for forming more than two marks, such as for forming ten marks or fifty marks or one hundred marks or many hundreds of marks, etc. The ink stream as considered herein differs from an ink jet in that an ink jet consists of individual droplets that are charged and then deflected by charged deflection plates. In contrast, the ink stream has a flow volume such that the stream is not discernable as individual droplets of ink and is not readily amenable to charge-based deflection. Said differently, an ink jet provides a plurality of discrete ink droplets with discernible and regular gaps therebetween, and the ink stream described herein constitutes a continuous flow of ink uninterrupted by gaps that are substantially smaller than the length of the ink stream. A typical ink droplet is no larger than about 100 microns in diameter (e.g., typically 50 microns to 70 microns), whereas the length of a given ink stream considered herein is substantially larger than that of a single ink droplet, i.e., the length of the ink stream (as measured between successive gaps in the ink stream) is substantially larger than the size (diameter) of one ink droplet, such as at least twice the size of typical ink droplet or at least four times the size of typical ink droplet or at least ten times the size of typical ink droplet or at least fifty times the size of typical ink droplet or at least one hundred times the size of typical ink droplet or at least one thousand times the size of a typical ink droplet.

In the discussion below, in an example the roller is said to have a rotation speed that is the same as the fiber speed. This means that for a given interval of time, a point on the optical fiber moves a distance X from a stationary reference position along the fiber path while a point on the perimeter of the roller also moves (along the curved path of the perimeter) a distance X from a stationary reference position at the roller perimeter.

Optical Fiber Marking Apparatus

FIG. 1A is a schematic diagram of an optical fiber marking apparatus ("apparatus") 10 for marking an optical fiber ("fiber") 50. The apparatus 10 has a first or starting end 12 and a second or finishing end 14. The fiber 50 is subjected to various processes (described below) and is in various states as it passes through the apparatus 10. Portions of the fiber 50 can differ in state or configuration along its length as it is being processed, such as unmarked, marked, marked but not covered (with a protective overcoat), and marked and covered (overcoated). It will be apparent to one skilled in the art based on the context of the discussion, the various Figures and the particular portion of the fiber 50 being discussed as to which state or configuration of the fiber is being considered.

Figure 1B:
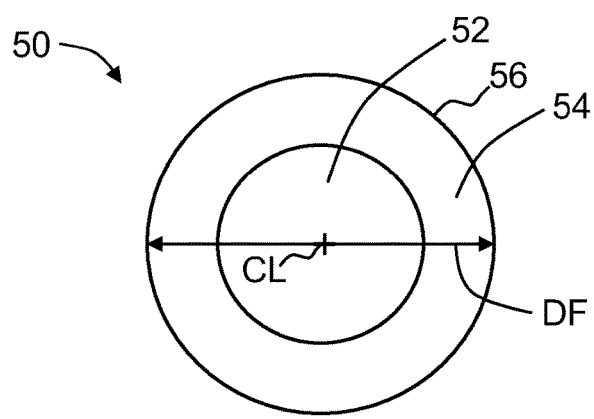
FIG. 1B is a close-up cross-sectional view of an example unmarked optical fiber.

The section of the fiber 50 upstream of marking location ML (see also FIG. 1C) is unmarked. The (unmarked) fiber 50 is shown in cross-sectional view in FIG. 1B. The fiber 50 comprises a glass fiber 52 that includes a glass core and a glass cladding (not shown separately), and a coating 54 that includes one or more layers designed to prevent damage to the glass fiber 52 when the fiber 50 is handled or subjected to stress. The coating 54 is common to most optical fibers and is typically a polymer (e.g. acrylate or urethane). In a typical configuration, the coating 54 includes a low-modulus primary layer adjacent the glass fiber 52 and a high-modulus secondary layer adjacent the primary layer. The fiber 50 has an outer surface 56, which in FIG. 1B is defined by the coating 54 but can also be defined by a protective overcoat as explained below. The fiber 50 has a centerline CL that defines an axial direction down the fiber. The fiber 50 has a diameter DF.

With reference again to FIG. 1A, the apparatus 10 includes at the first end 12 a payout module 20. The payout module includes a storage reel 30 that stores a length of unmarked fiber 50. The apparatus 10 also includes at the second end 14 a take-up module 220. The take-up module 220 includes a storage reel 230 that stores the fiber 50 after it has been marked and optionally covered with a protective overcoat by the apparatus 10, as explained below. The payout module 20 and the take-up module 220 each include a drive pulley 36D used to drive the fiber 50 over a fiber path FP through the apparatus 10 from the payout module 20 to the take-up module 220. In an example, the fiber path FP is defined at least in part by one or more guide pulleys 36G, such as the multiple guide pulleys as arranged and shown in FIG. 1A. Other arrangements of the guide pulleys 36G can also be effectively employed in the apparatus 10. The fiber 50 has a fiber speed SF over the fiber path FP as defined by the drive pulleys 36D. In the example configuration of FIG. 1A, the most upstream drive pulley 36D and the first downstream guide pulley 36G define a fiber span FS that is under tension.

The apparatus 10 further includes at least one marking unit 100 that resides downstream of the payout module 20 and upstream of the take-up module 220. A single marking unit 100 is shown in the apparatus 10 by way of example. The marking unit 100 is positioned adjacent the fiber path FP, as explained in greater detail below. The marking unit 100 has an (upstream) input end 102 that receives unmarked fiber 50 and a (downstream) output end 104 that delivers marked fiber to downstream units of apparatus 10.

A fiber positioning device 250 is operably located at or adjacent the marking unit 100. The fiber positioning device 250 defines the portion of the fiber path FP in the vicinity of the marking unit 100 and is used to adjust the position of the fiber 50 and the fiber path FP, as explained below.

Figure 1C:
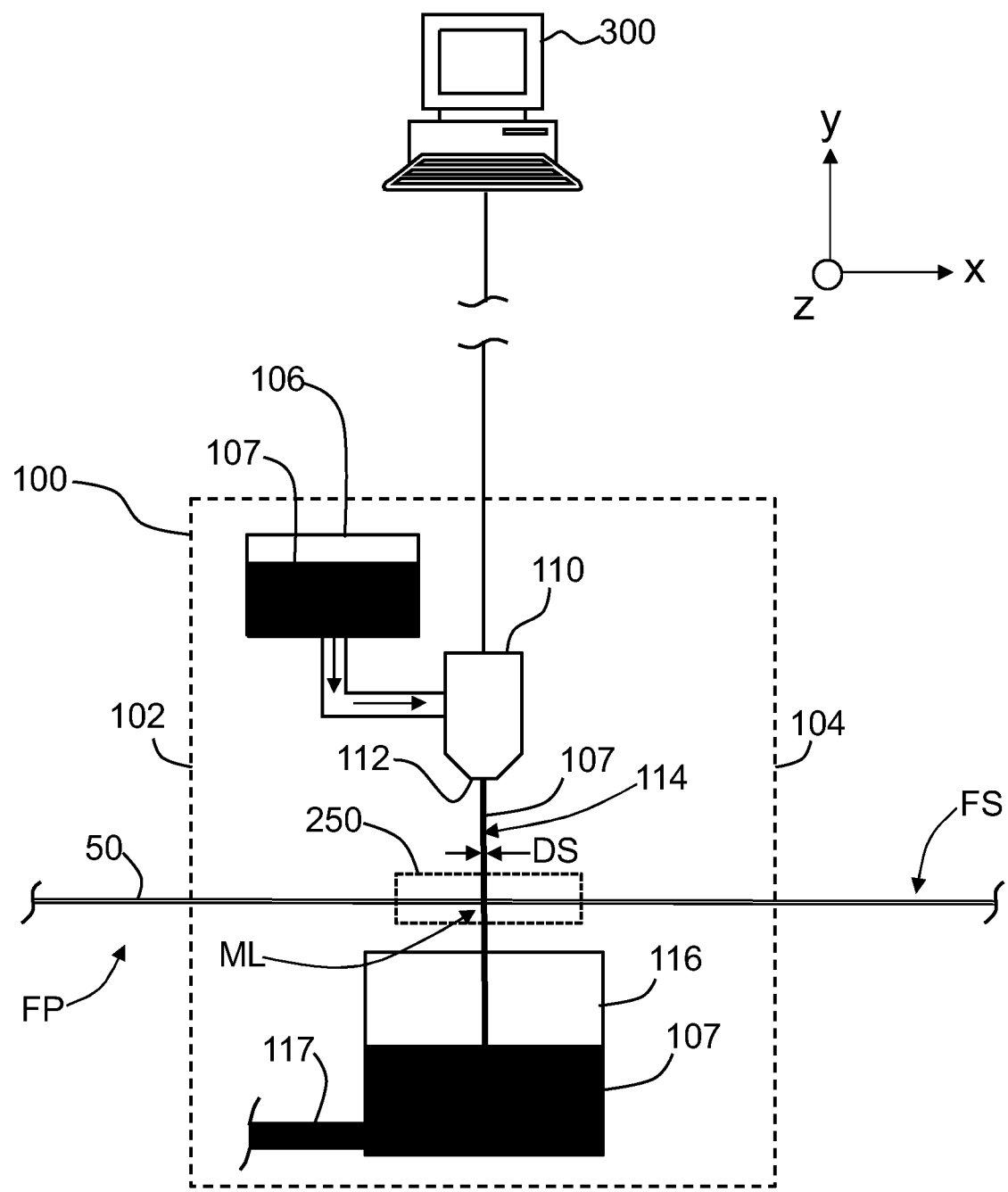
FIG. 1C is a close-up view of a marking unit of the apparatus along with the fiber positioning device shown as a dashed-line box.

FIG. 1C is a close-up view of an example marking unit 100. The marking unit 100 includes an ink supply 106 that supplies ink 107 to an ink dispenser 110 having an output end 112. The ink dispenser 110 outputs the ink 107 at the output end 112 the form of an ink stream 114 that defines a marking location ML. In an example, the output end 112 can include or be configured as a nozzle that defines a diameter DS of the ink stream. In an example, the nozzle can be configured to start and stop the flow of the ink stream, e.g., electrically controlled under the direction the controller 300 (introduced and discussed below). The ink stream 114 is shown as running (flowing) in the −y direction while the fiber 50 runs in the +x direction. More generally, the relative direction of the ink stream 114 and the fiber path FP can be any reasonable direction other than parallel, with a preferred relative direction for some applications substantially perpendicular, e.g., with the ink stream running in the vertical direction (i.e., along the direction of gravity) and the fiber path FP residing substantially in a horizontal plane to the vertical direction.

The ink 107 from the ink stream 114 that is not used forming marks 60 on the fiber 50 (the marking process is explained below) is collected by a container 116. A conduit (pipe) 117 that leads from the container 116 can be used to carry away the collected ink 107 so that it can be recycled (e.g., back to the ink supply 106) or disposed of. The ink stream 114 has a diameter DS. In general, the ink stream diameter DS can be any reasonable value for forming marks 60. An advantage of using an ink stream 114 over a conventional ink jet from an ink jet printer head that emits bursts of ink droplets is that the ink stream can have essentially an arbitrary size. In one example, the ink stream diameter DS can be in the range 20 µm≤DS≤5000 µm, or 50 µm≤DS≤5000 µm, or 100 µm≤DS≤5000 µm, or 250 µm≤DS≤5000 µm. In other examples, the ink stream diameter can be at least as large as half of the fiber diameter DF, and in other examples the ink stream diameter DS satisfies (0.5)·DF≤DS≤10·DF or DF≤DS≤5·DF or DF≤DS≤3·DF. The portion of the fiber 50 downstream of the marking location ML is marked fiber.

With reference again to FIG. 1A, an optional position sensor 120 can be disposed immediately downstream of the marking unit 100 and operably arranged relative to the fiber path FP to measure a displacement of the fiber 50 relative to a reference position, such as a nominal or ideal fiber path. A dryer unit 130 resides downstream of the position sensor 120 and includes an input end 132 for receiving the marked fiber 50 and an output end 134 for delivering the marked fiber in a state in which the ink 107 used to make the marks 60 has dried. The dryer unit 130 defines a drying location DL along the fiber path FP. In an example, the dryer unit 130 comprises a dryer tube 136 with an interior 138 through which the fiber path FP passes.

In an example, a mark counter 150 resides immediately downstream of the dryer unit 130 and is operably arranged relative to the fiber path FP to count the number of marks 60 to ensure that the proper number of marks per unit length (i.e., the mark number density N) is being generated by the apparatus 10. An overcoat applicator 170 resides downstream of the marking counter 150 and includes an input end 172 that receives the marked fiber 50 and an output end 174 that delivers a covered (overcoated) fiber. The fiber path FP passes through the overcoat applicator 170. In an example, the overcoat applicator 170 includes a coating tube 178 with an interior 179 through which the fiber path FP passes.

A curing system 190 resides immediately downstream of the overcoat applicator 170 and has an input end 192 for receiving the now marked and covered (overcoated) fiber 50 with an uncured overcoat, an output end 194 for delivering marked and covered fiber with a cured overcoat 180, and an interior 195, with the fiber path FP passing through interior. The combination of the overcoat applicator 170 and the curing system 190 defines an overcoating system 199.

The aforementioned take-up module 220 resides immediately downstream of the curing system 190 at the second (finishing) end 14 of the apparatus 10 and takes up the marked and overcoated fiber 50 onto the storage reel 230.

The apparatus 10 also includes a controller 300 that is operably connected one or more of the payout module 20, the take-up module 220, the marking unit 100, the fiber positioning device 250, the position sensor 120, the dryer unit 130, the mark counter 150, and the overcoating system 199. The controller 300 is configured to control these apparatus components and the overall operation of the apparatus 10, including the fiber speed (line speed) SF of the fiber 50 through the apparatus 10 over the fiber path FP. In an example, the controller 300 controls marking unit 100 to start and stop the ink stream 114. In some examples where the ink stream 114 is intermittent, the ink stream flow is timed to correspond to when the fiber 50 is deflected out of its nominal fiber path FP as described below. In some examples, the controller 300 starts the flow of the ink stream 114 at the start of the marking process and then terminates the flow of the ink stream when the fiber marking process is completed.

In an example, the controller 300 comprises a programmable logic controller (PLC) configured to carry out instructions (software, firmware, etc.) embodied in a non-transitory computer-readable medium and that cause the apparatus 10 to carry out the methods disclosed herein. In some examples, the controller 300 need not be connected to and control some of the apparatus components that could be operated independently.

While the fiber speed SF can be relatively slow (e.g., 0.5 m/s), the apparatus and methods disclosed herein are particularly useful for fiber speeds in excess of about 2 m/s or 5 m/s or 10 m/s. In an example, apparatus and methods disclosed herein can operate at fiber speeds SF of greater than 2 m/s, or greater than 5 m/s or greater than 10 m/s or greater than 20 m/s, or greater than 30 m/s, or greater than 40 m/s or greater than 50 m/s. In an example, the fiber speed SF is limited only by the operating limits of the fiber positioning device 250.

Fiber Positioning Device

Figure 2A:
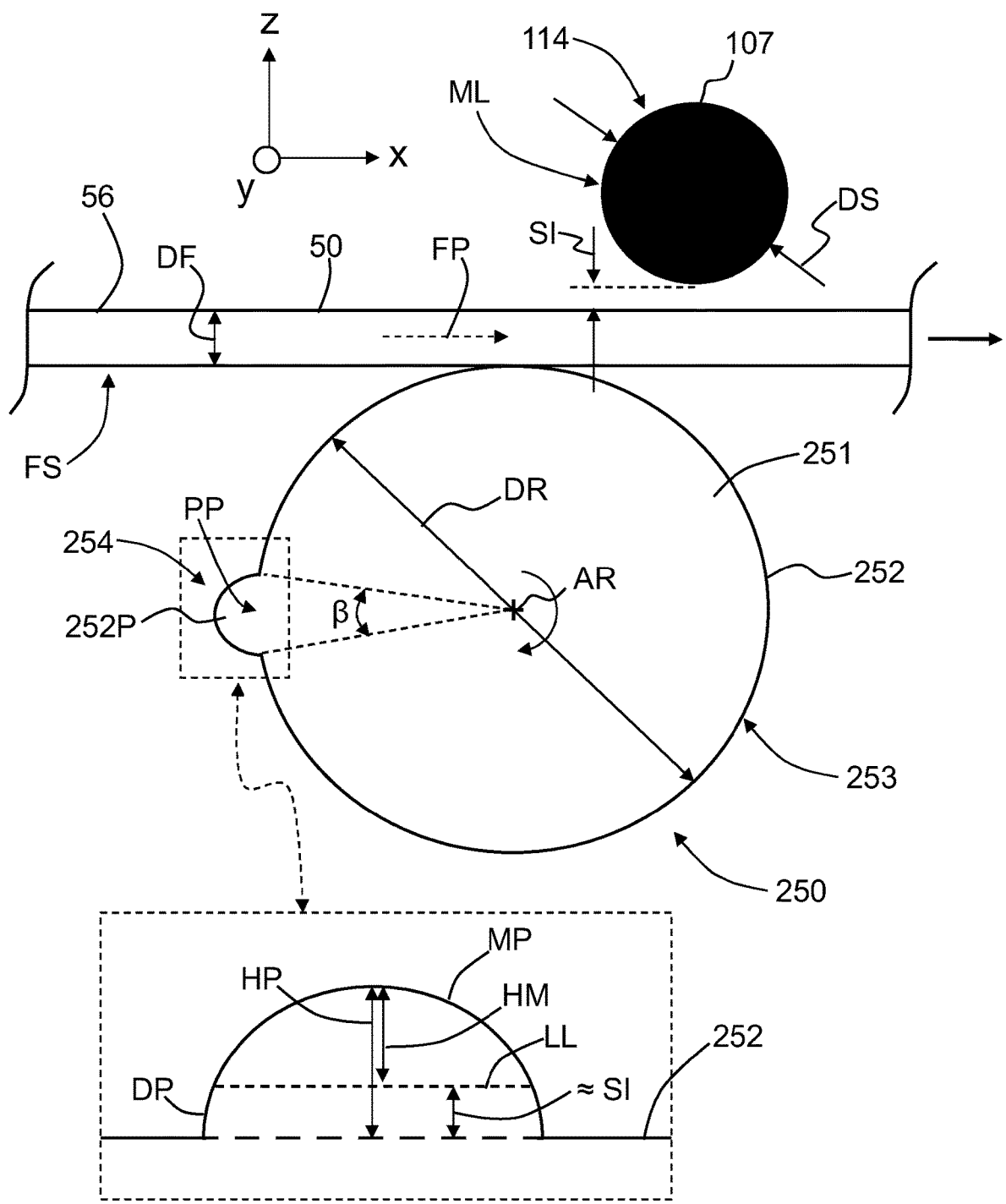
FIG. 2A is a close-up top-down view of an example fiber positioning device in the form of a generally round roller shown disposed adjacent the fiber path and the ink stream formed by the marking unit, wherein the fiber positioning device includes a position adjustment feature in the form of a protrusion on the generally round roller.

FIG. 2A is a close-up top-down view of an example fiber positioning device 250 of the marking unit 100. The fiber positioning device is arranged adjacent the fiber path FP proximate to the marking location ML in the apparatus 10. The fiber positioning device includes a roller 251. An example roller 251 has the general configuration of a round pulley (i.e., is disc shaped) and is shown residing in the x-y plane. The roller 251 has a perimeter 252 with a perimeter (outer) surface 253. The perimeter 252 includes at least one position adjustment feature 254. In the example of FIG. 2A, there is one position adjustment feature 254 in the form of a protrusion 252P located at a perimeter position PP. The protrusion 252P has a height HP as measured from the nominal perimeter surface 253 of the perimeter 252. The protrusion 252P can have a cross-sectional shape that is substantially semi-circular or a section of a semi-circle or a section of an ellipse, or any other reasonable shape capable of positioning the fiber 50 to accomplish the fiber marking process disclosed herein. The surface of the protrusion 252P constitutes part of the perimeter surface 253 and the perimeter 252 of the roller 251.

In an example, the protrusion 252P is a fixed part of the roller 251. In another example, the protrusion 252P is an adjustable part of the roller 251. For example, the roller 251 can be configured so that different protrusions 252P can be added to or removed from the roller at one or more locations at the perimeter 252. In another example, the protrusion 252P is adjustable within the roller 251 to change the size and/or shape of the protrusion.

The perimeter 252 has a circumference $CF = \pi \cdot DR + \delta$, where DR is the diameter of the roller 251 without the protrusion 252P, and where $\delta$ is the small amount of extra circumference added to the perimeter by the protrusion. The roller 251 has an axis of rotation AR that extends in the y-direction so that the roller resides in the x-z plane. In an example, the perimeter surface 253 can include a shallow groove (not shown) to accommodate a portion of the outer surface 56 of the fiber 50 to help guide the fiber. The rotation direction of the roller 251 is shown as clockwise about the axis of rotation AR.

With reference to the close-up inset of FIG. 2A, an imaginary limit line LL divides the surface of the protrusion 252P into two portions, namely an initial displacement portion DP that resides below the limit line, and a marking portion MP that resides above the limit line. This reason for this division will become more apparent in the explanation provide below.

Figure 2B:
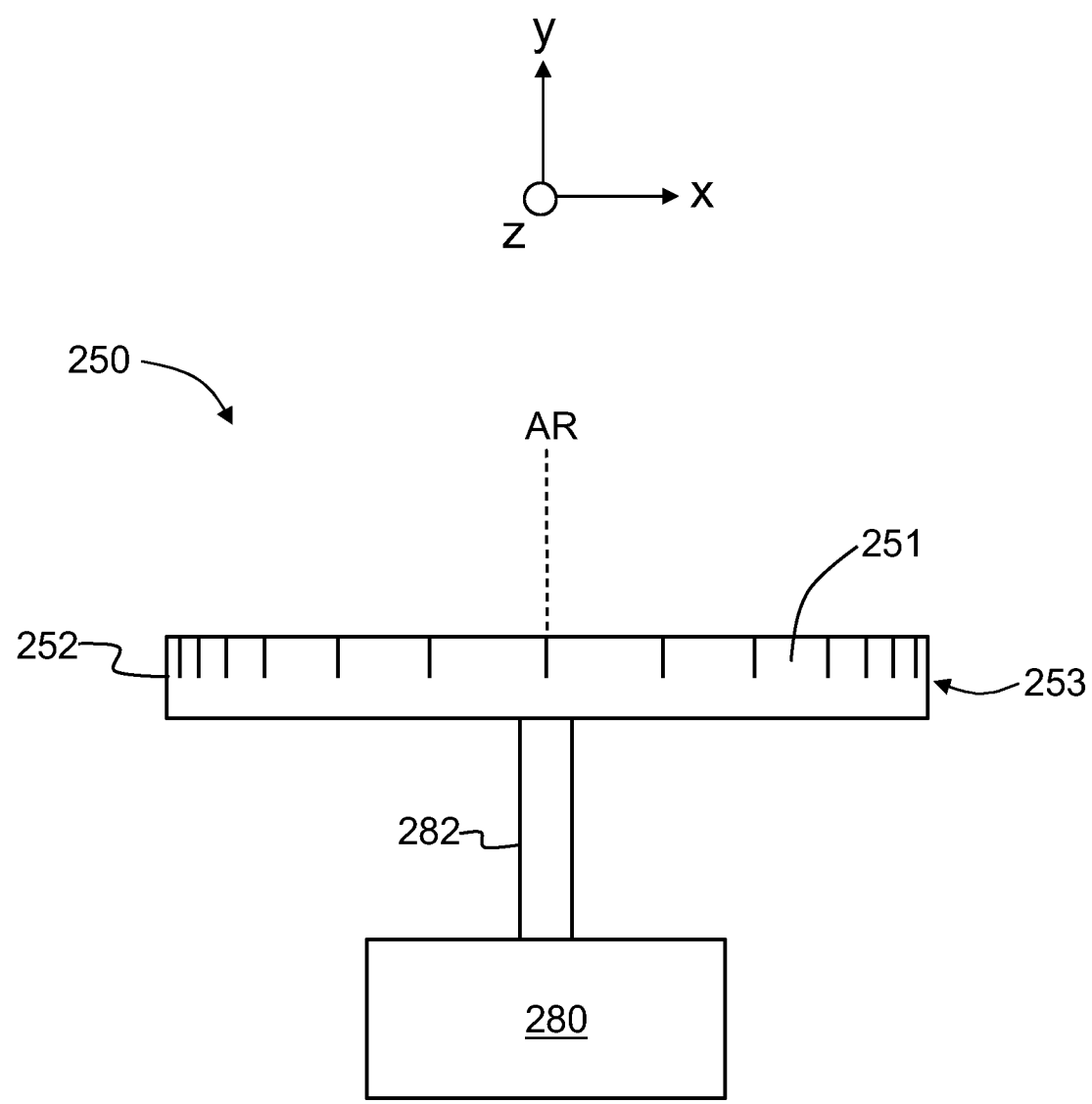
FIG. 2B is a side view of the example fiber positioning device of FIG. 2A showing how the roller is driven by a drive motor and a drive shaft.

FIG. 2B illustrates an example where the roller 251 is operably connected to and rotationally driven by a drive motor 280. In an example, the drive motor 280 is mechanically connected to the roller 251 via a drive shaft 282. In an example, the drive motor 280 is operably connected to the controller 300 so that the rotation speed of the roller corresponds to (i.e., substantially matches) the fiber speed SF.

Also shown in FIG. 2A is an x-z cross-sectional view of the ink stream 114. The ink stream 114 resides adjacent the fiber path FP so that the outer surface 56 of the fiber closest to the ink stream is spaced apart from the ink stream by a spacing SI when the protrusion 252P is not touching the fiber 50.

Figure 2C:
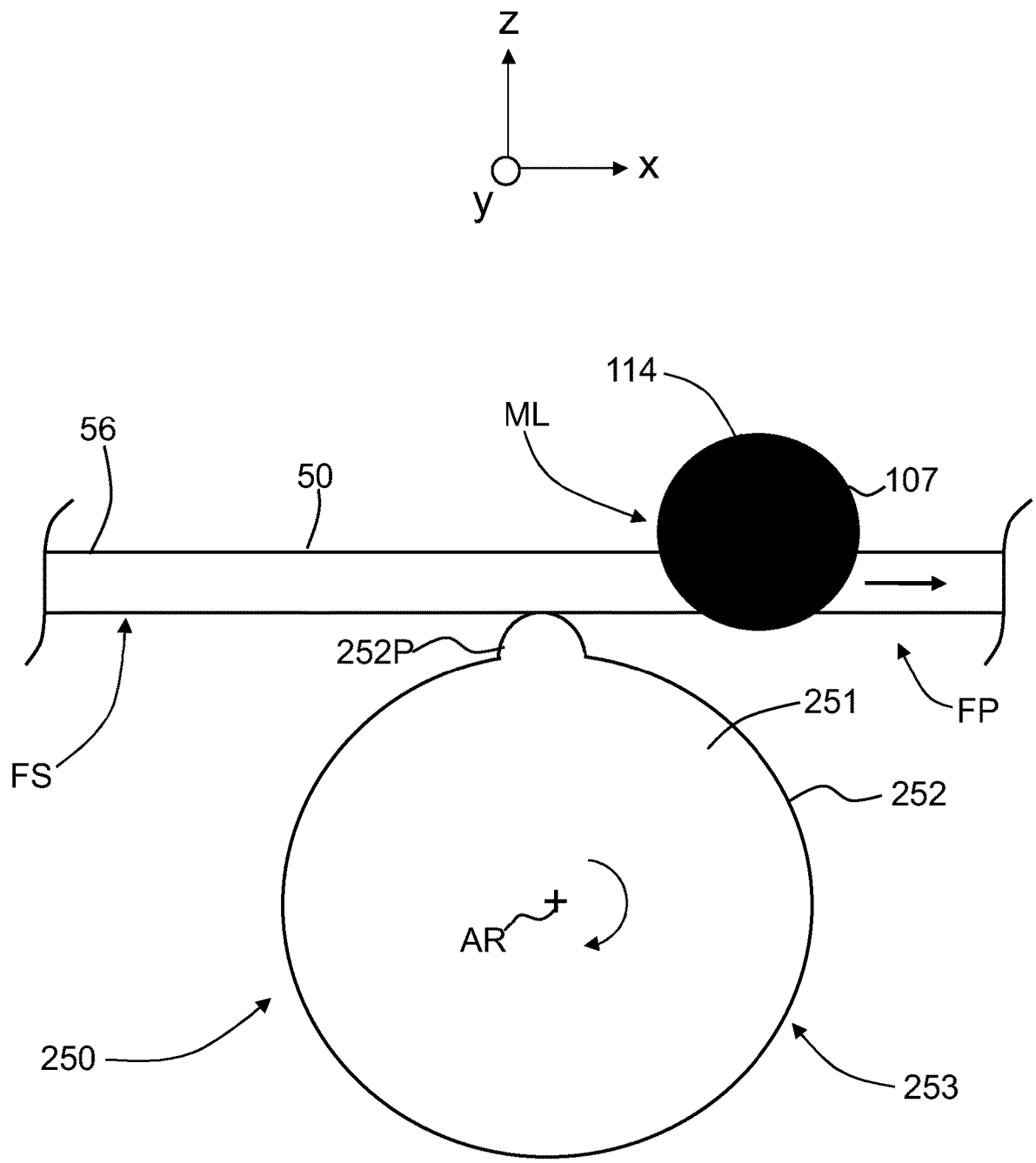
FIG. 2C is similar to FIG. 2A and shows the protrusion having moved clockwise to the 12 o'clock position where it pushes the optical fiber into the ink stream to form a mark on the optical fiber.
Figure 2D:
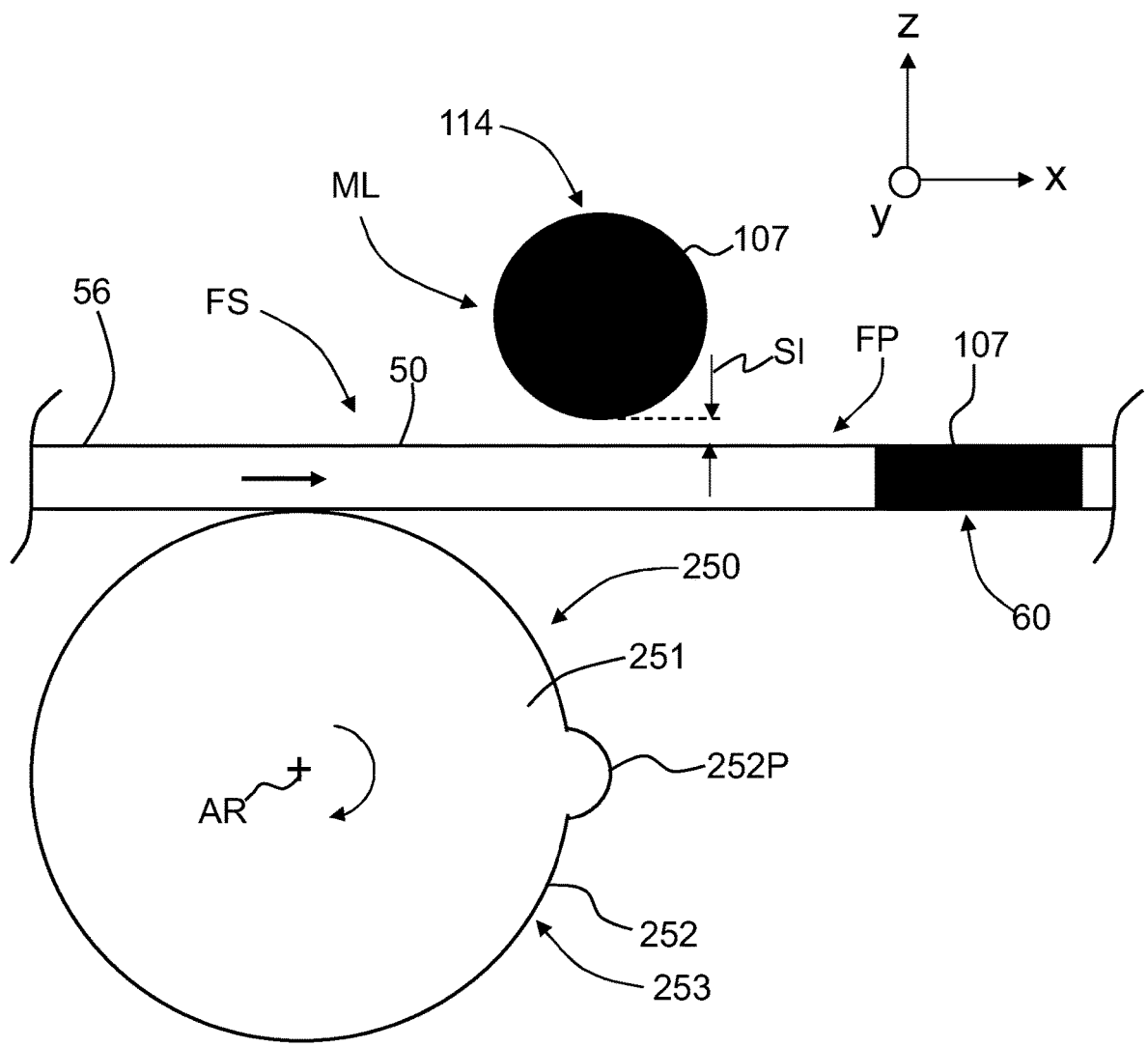
FIG. 2D is similar to FIG. 2A and shows the protrusion having rotated clockwise to the 3 o'clock position, allowing the optical fiber to return to its original fiber path.
Figure 2E:
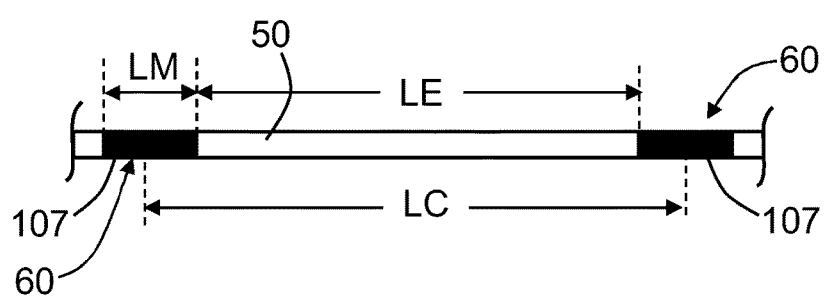
FIG. 2E is a close-up view of a section of the marked optical fiber showing two example spaced apart marks, the axial mark lengths LM, the center-to-center mark spacing LC and the edge-to-edge mark spacing LE.

With continuing reference to FIG. 2A as well as to FIG. 1A and FIGS. 2C and 2D, as the fiber 50 moves over the fiber path FP, the outer surface 56 of the fiber is in contact with the perimeter surface 253 of the fiber positioning device 250. The roller 251 of the fiber positioning device 250 rotates clockwise about its rotation axis AR as the fiber 50 moves over the fiber path FP. FIG. 2A shows the protrusion 252P at the 9 o'clock position and thus away from and not contacting the fiber 50. As the roller 251 rotates clockwise as shown, the protrusion 252P also moves clockwise and eventually approaches the 12 o'clock position, at which point the leading edge of the protrusion contacts the fiber 50 and starts to move the fiber in the z-direction. As the roller 251 continues to rotate to the 12 o'clock position, the protrusion 252P pushes the fiber 50 farther in the z-direction and into the ink stream 114, as shown in FIG. 2C. The continuing rotation of the roller 251 causes the fiber 50 to move down the trailing edge of the protrusion 254, thereby allowing the fiber to move in the z direction and exit the ink stream 114 and eventually return to its original fiber path FP, as shown in FIG. 2D. This process is repeated every time the protrusion 252P contacts the fiber 50. The ink 107 from the ink stream 114 deposited on the fiber outer surface 56 every time the fiber 50 resides within the ink stream forms spaced apart marks 60, as shown in FIG. 2E. Each mark has an axial length LM while adjacent marks have a center-to-center spacing of LC and an edge-to-edge spacing LE.

With reference again to the close-up inset of FIG. 2A, for configurations of the protrusion 252P wherein the angle β subtended by the protrusion is relatively small (e.g., β<30 degrees), the distance from the base of the protrusion 252P to the limit line LL will be about the same as the spacing SI between the fiber 50 and the ink stream 114. The distance from the limit line to the top (apex) of the protrusion 252P is HM. As discussed above, as the leading edge of the perimeter 252 of the protrusion 252P contacts the fiber 50, the fiber starts to move toward the ink stream 114. The portion of the outer surface 56 of the fiber 50 closest to the ink stream 114 will touch the ink stream 114 once the fiber has traveled a distance equal to the spacing SI. As the roller 251 continues to rotate, the fiber 50 starts to contact the marking portion MP of the protrusion. At this point, the fiber 50 starts to enter the ink stream 114 since now the fiber 50 has moved a distance greater than the spacing SI. The maximum z-direction movement of the fiber 50 occurs when the very top (apex) of the protrusion 50 that defines the protrusion height HP is in contact with the fiber 50. In an example, the top of the protrusion 252P can include a flat portion rather than a peak, or as noted above can have any reasonably shaped cross-section. The protrusion 252P is shown in the Figures as being generally semi-circular for ease of illustration and discussion. In an example, the fiber position is changed such that the portion of the fiber at the ink stream 114 resides completely within the ink stream. In an example, this occurs when HM≥DF.

The center-to-center spacing LC of adjacent marks 60 (FIG. 2E) is defined by the circumference CF of the fiber positioning device 250. For example, for a 200 millimeter center-to-center spacing LC, the circumference of fiber positioning device 250 is also 200 millimeters. To form marks 60 with axial lengths LM of 4 millimeters, the protrusion 252P is formed such that the circumferential length of the marking portion MP of the protrusion is 4 mm. In the case where the marks 60 are to be in the form of rings that go all the way around the fiber circumference, the marking portion MP of the protrusion 252P is formed to push the fiber 50 all the way into the ink stream 114 while the fiber contacts the marking portion. In an example, the spacing SI can be 1 mm to 3 mm, which is relatively small compared a center-to-center mark spacing LC of 100 mm or greater (e.g., up to 500 mm). This means that the height HP of the protrusion need only be on the order of a few millimeters, while in an example the diameter DR of the roller 251 can be about 30 mm (for CF=LC=100 mm) to about 60 mm (for CF=LC=200 mm).

Note that in an example, the amount δ of the total perimeter circumference CF added by the protrusion 252P is given by δ≈LM+2·SI, where the height SI is taken as a linear approximation to the length of the otherwise curved outer surface of the protrusion 252P associated with the displacement portion DP. For LM=4 mm and SI=2 mm, δ=8 mm. For a center-to-center spacing LC=200 mm, this value of δ is only 4% of the total circumference CF. It is worth noting again that the Figures are not to scale and the sizes of the various elements in the drawing are selected for ease of illustration and discussion. It is also pointed out that the roller 251 can support multiple protrusions 252P (e.g., evenly spaced or unevenly spaced, with different shapes, etc.) to form multiple marks 60 for each rotation of the roller 251.

Figure 3A:
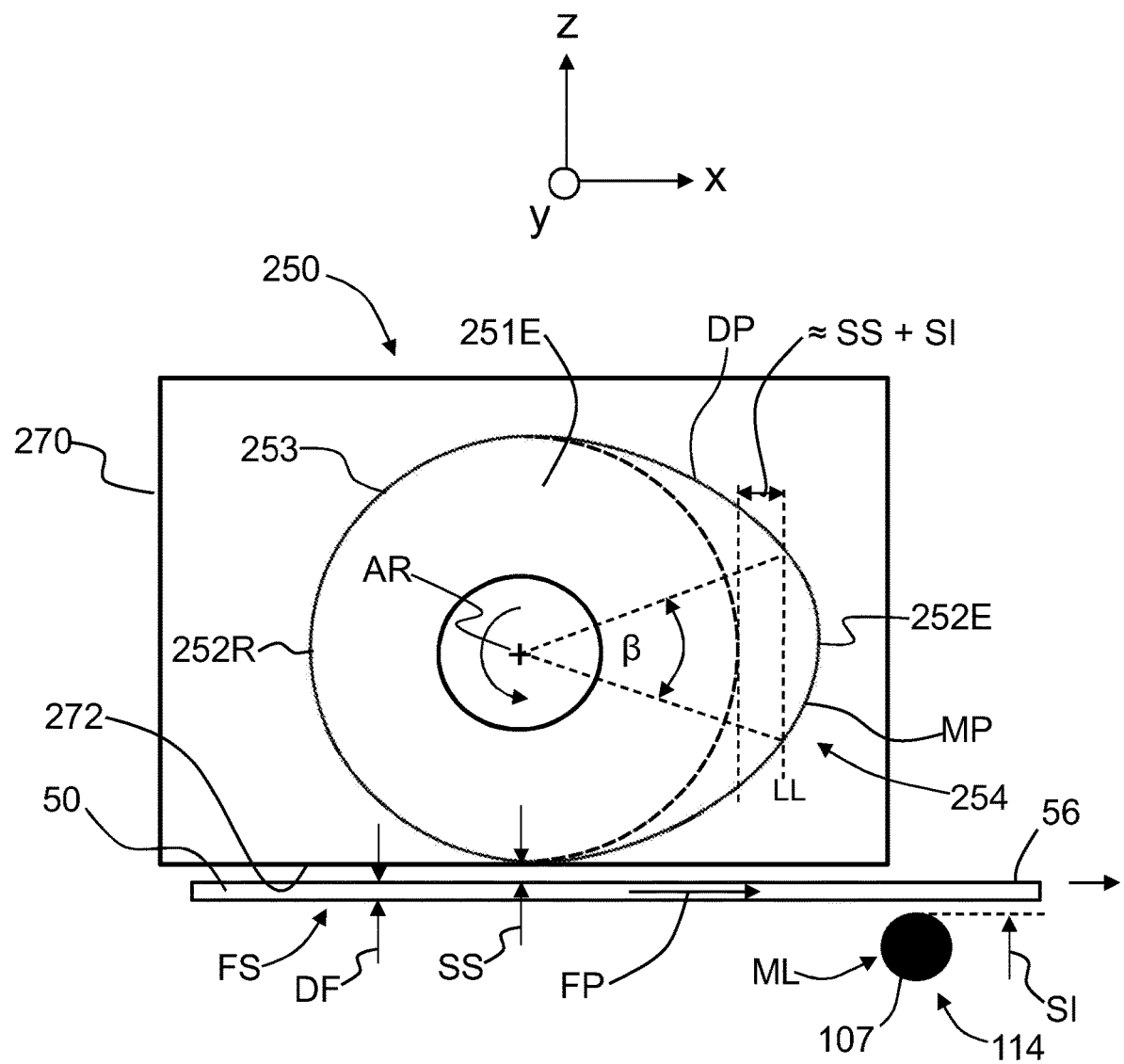
FIG. 3A is a close-up top-down view of an example fiber positioning device that utilizes an eccentric roller having an eccentric portion that serves as the position adjustment feature.

FIG. 3A is similar to FIG. 2A and shows another example configuration of the fiber positioning device 250 wherein the roller 251 has an eccentric shape (and so is referred to hereinafter as the "eccentric roller" and denoted 251E) wherein the perimeter 252 has a round portion 252R and an eccentric portion 252E, with the eccentric portion constituting the fiber positioning feature 254. The eccentric portion 252E can be thought of as a more extended form of the protrusion 252P. The eccentric portion 252E has the advantage over a more abrupt protrusion in that the pushing force on the fiber 50 by the perimeter 252 of the eccentric roller 251 can be made gradual, with contact of the fiber initiated at a grazing incidence. An advantage of a more pronounced protrusion 252P is that the transition of the fiber 50 into and out of the ink stream 114 can be made more abrupt, resulting in marks 60 having relatively sharp edges.

Figure 3B:
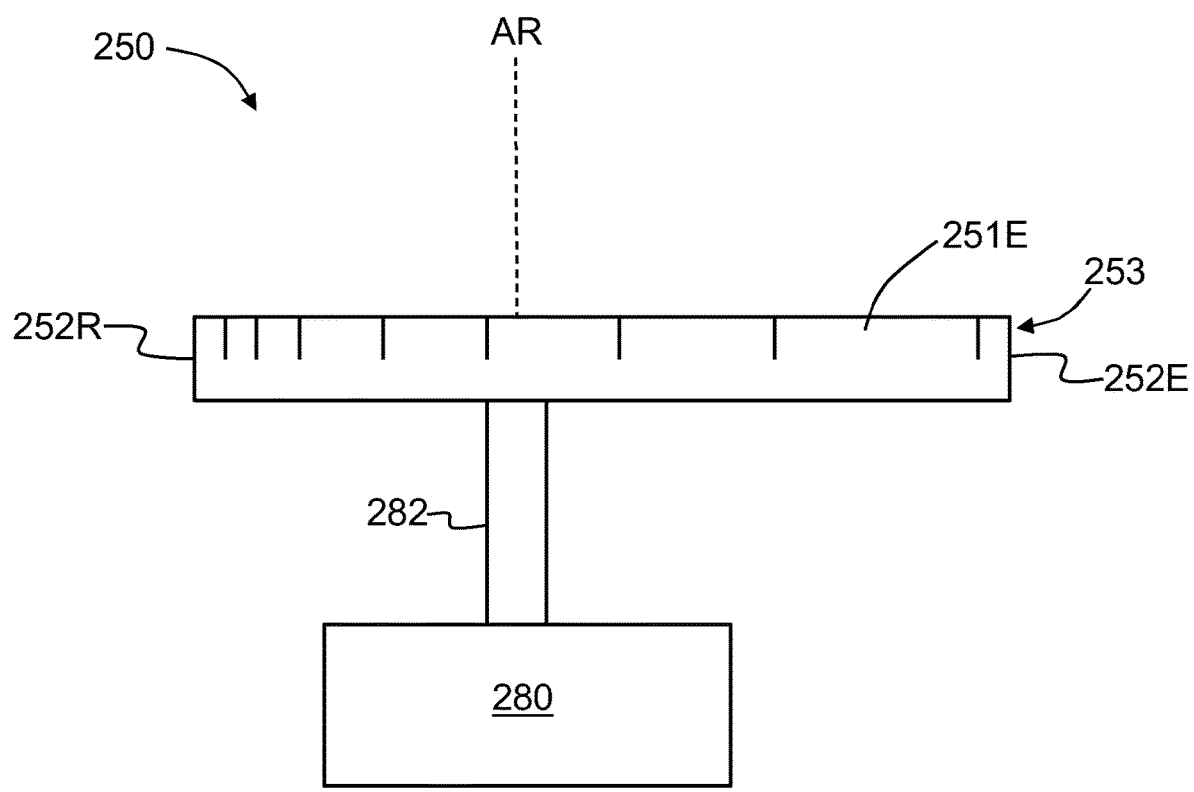
FIG. 3B is similar to FIG. 2B and shows the eccentric roller operably connected to a drive motor via a drive shaft.

The eccentric roller 251E is shown operably supported by an adjustable support member 270, which in an example can comprise a precision stage that is moveable in the x, y and z directions and optionally rotatable about the x, y and z axes. The adjustable support member 270 has an edge 272 proximate to the fiber path FP. As with the circular roller 251, the eccentric roller 251E is operably connected to and rotationally driven by the drive motor 280, as shown in FIG. 3B. In an example, the drive motor 280 is mechanically connected to the eccentric roller 251 via the drive shaft 282.

Like the protrusion-based fiber positioning feature 252P, the eccentric portion 252E can be divided into the displacement portion DP and the marking portion MP by an imaginary limit line LL, as shown in FIG. 3A.

FIG. 3A shows the eccentric portion 252E at the 3 o'clock position, with the eccentric roller 251E shown by way of example as rotating counter-clockwise and the fiber 50 moving from left to right over the fiber path FP. The ink stream 114 is shown displaced from the fiber 50 by the spacing SI. Observe that in the present embodiment, the round portion 252R of the perimeter 252 of the eccentric roller 251E does not touch the fiber 50 and is spaced apart therefrom by a spacing SS. Thus, the displacement portion DP is defined approximately by SS+SI, ignoring the diameter DF of the fiber 50, which is typically only a fraction of a millimeter. Note that the circular roller 251 and the eccentric roller 251E can be rotated clockwise or counterclockwise as needed, depending on the direction of the movement of the fiber 50 over the fiber path FP.

Figure 3C:
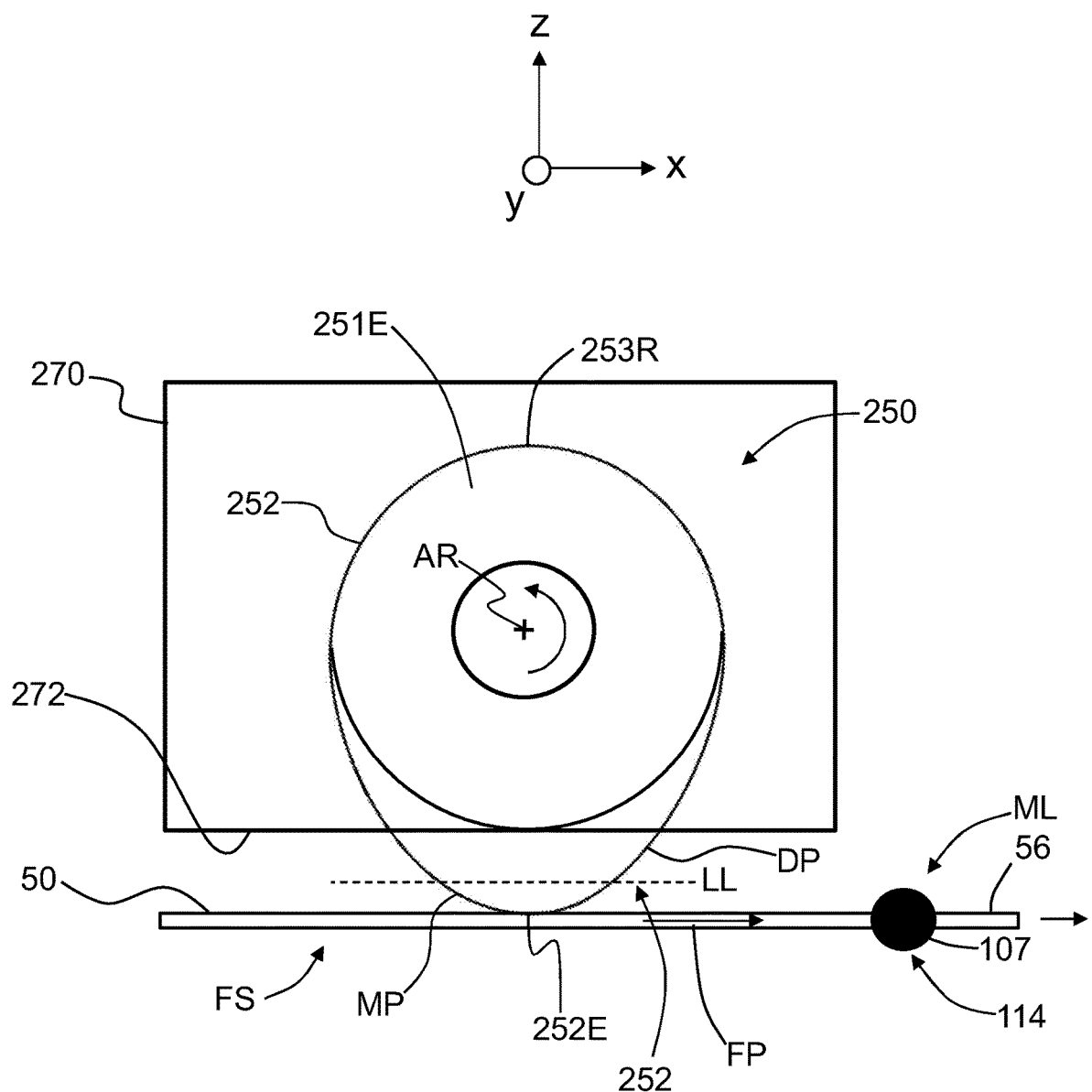
FIG. 3C is similar to FIG. 3A and shows the eccentric portion of the eccentric roller having rotated counterclockwise to the 6 o'clock position where it engages the optical fiber to push the optical fiber into the ink stream to form a mark on the optical fiber.

FIG. 3C is similar to FIG. 3A but shows a point later in time when the eccentric portion 252E of the eccentric roller 251E has rotated by 270 degrees in the counter-clockwise direction and is now at the 6 o'clock position. As the leading edge of the eccentric portion 252E associated with the displacement portion DP contacts the fiber 50, it starts to push the fiber toward the ink stream 114. As the fiber 50 contacts the marking portion MP, the fiber is pushed into the ink stream 114 and stays in the ink stream until the eccentric roller 251E rotates to where the trailing edge of the eccentric portion 252E associated with the displacement portion DP contacts the fiber. As the eccentric roller 251E continues to rotate counter-clockwise, the eccentric portion 252E loses contact with the fiber 50, which returns to its original position, i.e., the fiber path FP corresponding to when the fiber is not being marked.

This process is repeated every time the eccentric portion 252E contacts the fiber 50. The ink 107 from the ink stream 114 deposited on the fiber outer surface 56 every time the fiber 50 resides within the ink stream forms spaced apart marks 60, as shown in FIG. 2E introduced and discussed above.

As with the circular roller embodiment discussed above, the circumference CF of the perimeter 252 of the eccentric roller 251E determines the center-to-center spacing LC of adjacent marks 60. Likewise, the portion of the circumference CF that resides in the marking portion MP of the perimeter 252 defines the axial length LM of each mark 60. Rotating the eccentric roller 251E with a rotational speed that matches the fiber speed SF reduces the risk of damaging the fiber 50 when the eccentric portion 252E contacts the fiber 50.

Figure 3D:
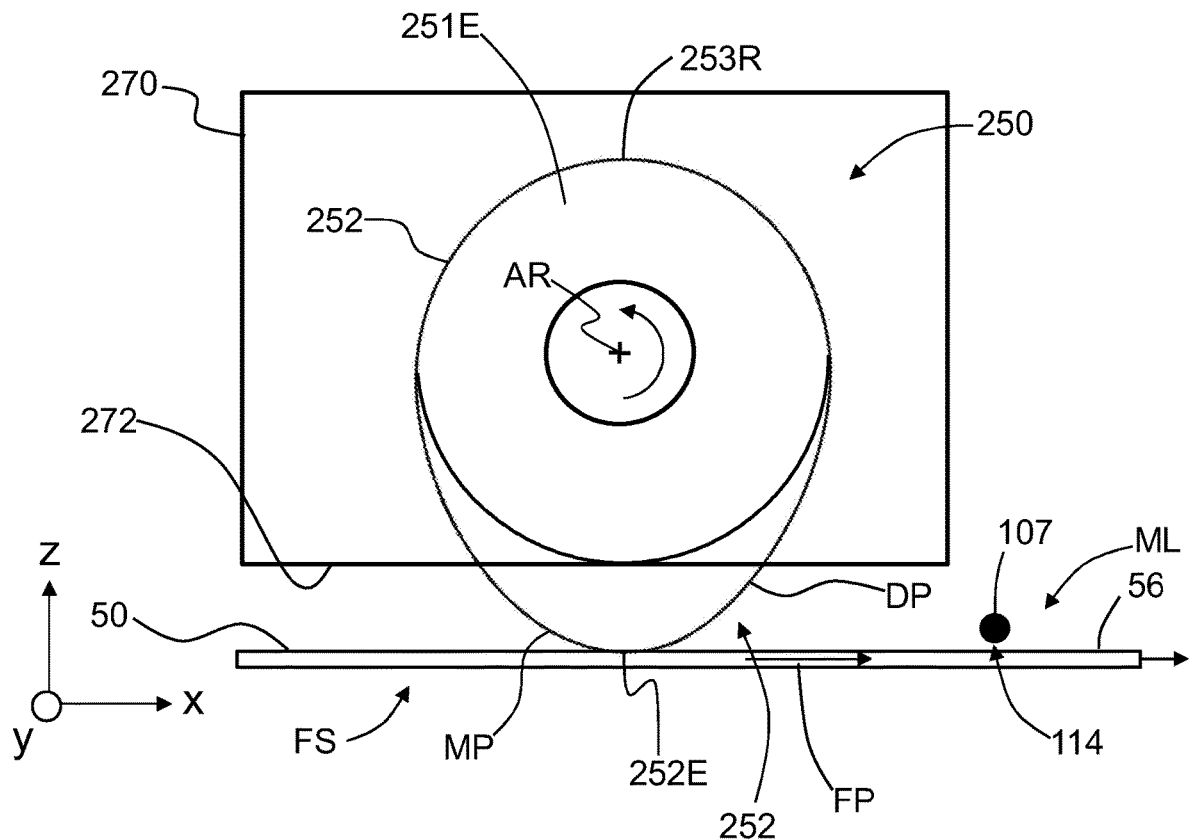
FIG. 3D is similar to FIG. 3C and illustrates an example wherein the optical fiber is pushed through the ink stream and exits the other side so that the optical fiber passes twice through the ink stream for each displacement of the optical fiber.
Figure 3E:
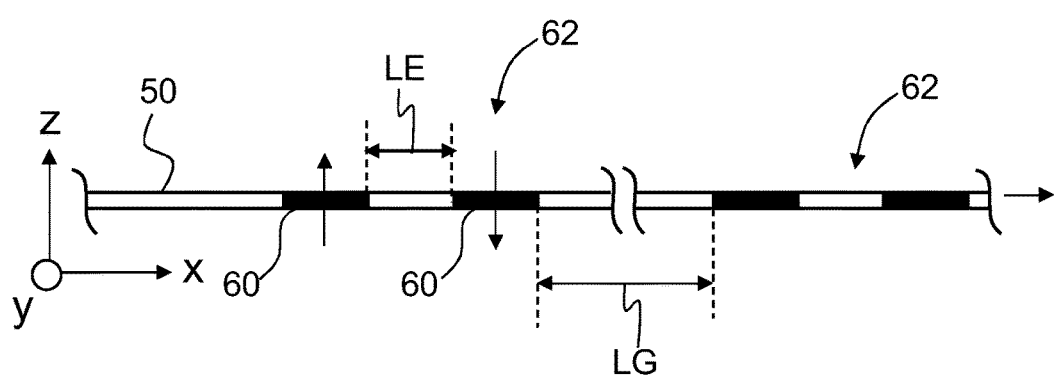
FIG. 3E is a close-up view of an example optical fiber processed using the example of FIG. 3D, wherein the marks are formed in pairs or groupings.

FIG. 3D is similar to FIG. 3C and illustrates an embodiment of the fiber marking process and apparatus that applies to both the circular roller and eccentric embodiments wherein the fiber 50 is displaced through the ink stream 114 in the −z direction and out the other side of the ink stream. The fiber 50 then returns through the ink stream 114 in the +z direction. This approach forms two closely spaced marks 60, as shown in FIG. 3E. This marking approach facilitates the formation of pairs of closely spaced marks 60 to form groupings 62 of marks 60, with the groupings spaced apart by a grouping distance LG. In this embodiment, the edge-to-edge spacing LE between adjacent marks 60 in a grouping 62 can be relatively small, e.g., a few millimeters, or on the order of the size (length LM) of a given mark 60.

As noted above, the apparatus 10 includes at least one marking unit 100. Thus, in other embodiments, the apparatus 10 includes multiple marking units 100 arranged so that marks 60 are formed from the multiple marking units prior to the marks being processed as described above. The use of multiple marking units 100 can be used to form a higher number density of marks 60 and to form select groupings 62 of marks. The use of multiple marking units 100 also allows for the marks 60 to have different colors by using different colored ink streams 114 for the different marking units 100.

Furthermore, a marking unit 100 can be disposed within or downstream of the overcoating system 100 to form marks 60 on the protective overcoat 180 rather than or in addition to marks residing beneath the protective overcoat. This approach can be useful where the protective overcoat is colored and where the marks 60 can be more visible on the outer surface of the protective overcoat 180 rather than underneath the protective overcoat.

It will be understood that the various design parameters of apparatus 100, such as the number of marking units 100, the particular size, shape, number, spacings, etc. of the protrusions 252P and/or the eccentric portion 252E can be selected to form marks 60 having a variety of sizes, shapes, spacings, groupings, patterns and colors.

Apparatus Set Up and Method of Operation for Marking

With reference again to FIG. 1A, as part of the setting up of apparatus 10, the storage reel 30 with the unmarked fiber 50 is loaded into the payout module 20. The unmarked fiber 50 is then fed through the nearby drive pulley 36D.

With reference again also to FIG. 1A, the fiber 50 is led over the fiber path FP through the marking unit 100 and past the fiber positioning device 250, and then to the position sensor 120 and through the interior 138 of the dryer unit 130. The fiber 50 is then led around the three guide pulleys 36G that reside downstream of the dryer unit 130. The fiber 50 is then led under the mark counter 150, through the overcoat applicator 170 and then through the curing system 190. The fiber 50 is then led around the drive pulley 36D of the take-up module 220 and onto the take-up reel 230.

Once the fiber 50 is set up to travel over the fiber path FP through the apparatus 10 and its various components as described above, the controller 300 activates the drive pulleys 36D of the payout module 20 and the take-up module 220 to start moving the fiber 50 along the fiber path at a select speed SF.

Once the fiber 50 ramps up to the select fiber speed SF, the marking unit 100 and the fiber positioning device 250 are activated (e.g., via the controller 300). With reference to FIG. 2C, this includes causing the ink dispenser 110 to dispense from its output end 112 the ink 107 in the form of the ink stream 114. As the fiber 50 moves along the fiber path FP, the fiber positioning device 250 acts to periodically move the fiber into and out of the ink stream 114 as described above so that spaced apart marks 60 are formed on the fiber.

In an example, the edge-to-edge spacing LE between adjacent marks 60 can be in the range between 5 mm and 500 mm, or 10 mm and 500 mm or 25 mm and 500 mm or 50 mm to 250 mm, with LE=250 mm being suitable for fibers used in submarine cables. In an example, the number density N of the marks 60 can be between 1 and 40 per meter, or between 2 and 20 per meter, or between 3 and 10 per meter, or between 3 and 7 per meter.

Once the ink 107 is deposited on the unmarked fiber 50 to form the mark 60, the ink needs to be dried so that the mark 60 becomes substantially permanent. This is accomplished by passing the marked fiber 50 exiting the marking unit 100 at the output end 104 through the interior 138 of the dryer tube 136 of the dryer unit 130. In one example, the dryer unit 130 is configured to flow hot air through the interior 138 of the dryer tube 136 to dry the ink 107 that forms the mark 60. In a particular example, the hot air flashes off substantially all of solvent (e.g., MEK) from the ink 107 to leave pigment on the outer surface 56. Evaporation of the solvent improves the adhesion between the mark 60 and the outer surface 56 of the fiber 50. The dryer unit 130 is not limited to an air-based dryer and in other examples the drying can be accomplished using other means, such as microwaves, infrared radiation, ultraviolet radiation, convected hot air, etc.

With reference again to FIG. 1A and to FIG. 2C, the marked fiber 50 exits the output end 134 of the dryer unit 130 and then passes by the marking counter 150, which counts the number of marks, e.g., as a measured number density $N_M$. The measured number density $N_M$ from the mark counter 150 is sent to the controller 300 and compared to the expected (selected) number density N. The mark counter 150 is used for quality control, i.e., to ensure that the correct number density N of marks 60 is being formed, to spot any missing marks 60, to find extra marks, and to identify incorrectly formed marks.

With reference now to FIG. 1A and to the close-up view of FIG. 4, the marked fiber 50 continues to the overcoat applicator 170 of the overcoating system 199. FIG. 5 is a cross-sectional view of the marked fiber 50 taken at one of the marks 60 at the location a-a in FIG. 4 and illustrates an example ring-type mark 60 that makes a complete circuit of the optical fiber circumference (closed ring mark).

The overcoat applicator 170 deposits an overcoat material 176 on the outer surface 56 of the marked fiber 50 to form a covered or overcoated fiber. The overcoat material 176 forms a protective overcoat 180 over the entire outer surface 56, including any marks 60 thereon. In an example, the overcoat applicator 170 comprises a coating tube 178 with an interior 179 through with the fiber path FP passes. The overcoat material 176 is provided to the interior 179 so that the fiber 50 passes through the overcoat material 176, which is the substantially uniformly applied around the circumference (or portion thereof) of the outer surface 56 of the marked fiber.

In an example, the overcoat material 176 is at least semi-transparent so that the marks 60 are visible through the overcoat 180. Further in an example, the overcoat material 176 can be colored (e.g., via a pigment) to define a colored overcoat 180, e.g., yellow for submarine fibers 50. In an example, the overcoat material 176 is light-curable, e.g., by ultraviolet (UV) radiation. In an example, the overcoat material 176 comprises a UV-curable acrylate. The main purpose of the overcoat 180 is to protect the marks 60 from external wear, such as from handling by field personnel, abrasion or rubbing against adjacent fibers or cable surfaces, etc.

Figure 7:
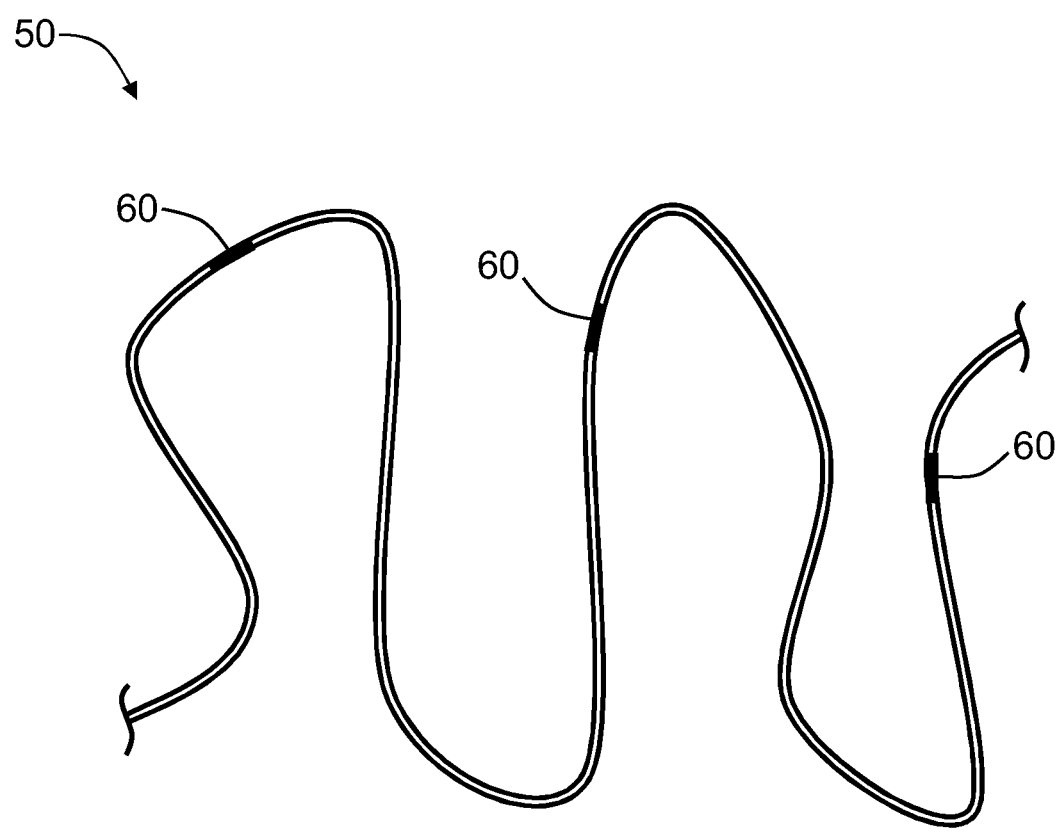
FIG. 7 is a schematic diagram of a section of the marked and overcoated optical fiber showing the spaced-apart marks formed using the apparatus and methods disclosed herein.

With continuing reference to FIG. 1A and to FIG. 4, upon exit from overcoat applicator 170, the fiber 50 is passed through the curing system 190 to cure the overcoat material 176. In an example, the curing system 190 is light based and is configured to generate actinic light 196 (e.g., UV radiation) that irradiates the overcoat material 176 and cures it to form overcoat 180. In an example, the curing system 190 has an interior 195 and the actinic light 196 is incident upon the overcoat material 176 from substantially 360°. FIG. 6 is similar to FIG. 5 and shows the marked fiber 50 with the protective overcoat 180. FIG. 7 is a schematic diagram of a section of marked fiber 50 (or marked and overcoated fiber 50) showing spaced apart marks 60 formed using the apparatus and methods described herein.

Clause 1 of the present disclosure extends to:
A method of marking an optical fiber having an outer surface, comprising:
  forming from ink an ink stream;
  moving an optical fiber over a fiber path that resides adjacent the ink stream; and
  periodically changing the position of the fiber path so that the optical fiber at least partially enters the ink stream so that the ink forms spaced apart marks on the outer surface of the optical fiber.

Clause 2 of the present disclosure extends to:
The method according to clause 1, wherein the fiber path is substantially perpendicular to the ink stream.

Clause 3 of the present disclosure extends to:
The method according to clause 1 or 2, wherein the periodically changing comprises causing the optical fiber to completely enter the ink stream.

Clause 4 of the present disclosure extends to:
The method according to any of clauses 1-3, wherein the optical fiber at least partially entering the ink stream comprises the optical fiber passing through the ink stream in a first direction and passing back through the ink stream in a second direction opposite to the first direction.

Clause 5 of the present disclosure extends to:
The method according to any of clauses 1-4, wherein said periodically changing comprises pushing the optical fiber with at least one position adjustment feature at a perimeter of a rotating roller.

Clause 6 of the present disclosure extends to:
The method according to clause 5, wherein the rotating roller has a generally circular shape with the perimeter and wherein the at least one position adjustment feature comprises a protrusion at the perimeter.

Clause 7 of the present disclosure extends to:
The method according to clause 5, wherein the rotating roller has an eccentric shape and wherein the at least one position adjustment feature comprises an eccentric portion of the perimeter.

Clause 8 of the present disclosure extends to:
The method according to any of clauses 5-7, wherein the optical fiber has a fiber speed over the fiber path, and wherein the rotating roller has a rotational speed substantially the same as the fiber speed.

Clause 9 of the present disclosure extends to:
The method according to any of clauses 1-8, wherein the marks have an axial length between 1 mm and 10 mm.

Clause 10 of the present disclosure extends to:
The method according to clause 9, wherein the marks have a center-to-center spacing of between 5 mm and 500 mm.

Clause 11 of the present disclosure extends to:
The method according to any of clauses 1-10, wherein the marks are initially formed as wet marks, and further comprising drying the wet marks to form dry marks.

Clause 12 of the present disclosure extends to:
The method according to clause 11, further comprising forming a protective overcoat over the outer surface of the optical fiber and the dry marks.

Clause 13 of the present disclosure extends to:
The method according to any of clauses 1-12, wherein the moving of the optical fiber over the fiber path includes moving the optical fiber at a line speed of at least 10 meters per second.

Clause 14 of the present disclosure extends to:
The method according to clause 13, wherein the line speed is at least 50 meters per second.

Clause 15 of the present disclosure extends to:
The method according to any of clauses 1-14, wherein the ink stream flows continuously while forming at least two of the spaced apart marks.

Clause 16 of the present disclosure extends to:
The method according to any of clauses 1-15, wherein the ink stream has a diameter DS in the range 20 µm≤DS≤5000 µm.

Clause 17 of the present disclosure extends to:
The method according to any of clauses 1-15, wherein the optical fiber has a diameter DF and the ink stream has a diameter DS in the range (0.5)·DF≤DS≤10·DF.

Clause 18 of the present disclosure extends to:
The method according to clause 17, wherein DF≤DS≤5·DF.

Clause 19 of the present disclosure extends to:

A method of marking an optical fiber, comprising:
- causing the optical fiber to move over a fiber path, wherein the moving optical fiber has an outer surface;
- forming on the moving optical fiber a select number density of wet ink marks per unit length on the outer surface of the optical fiber by periodically moving the fiber path so that it periodically intersects an ink stream;
- drying the wet ink marks at a drying location to form dried ink marks; and
- applying a substantially transparent protective coating over the dried ink marks and the outer surface of the moving optical fiber, wherein the dried ink marks are visible through the substantially transparent protective coating.

Clause 20 of the present disclosure extends to:
The method according to clause 19, wherein the periodically moving of the fiber path comprises pushing the optical fiber using a fiber positioning device.

Clause 21 of the present disclosure extends to:
The method according to clause 20, wherein the fiber positioning device comprises a rotating roller having a perimeter with at least one position adjustment feature at the perimeter.

Clause 22 of the present disclosure extends to:
The method according to clause 21, where the rotating roller has either a circular shape or an eccentric shape.

Clause 23 of the present disclosure extends to:
The method according to any of clauses 19-22, wherein the fiber path is substantially perpendicular to the ink stream.

Clause 24 of the present disclosure extends to:
The method according to any of clauses 19-23, wherein the marks have an axial length between 1 mm and 10 mm and a center-to-center spacing of between 5 mm and 500 mm.

Clause 25 of the present disclosure extends to:
The method according to any of clauses 19-24, wherein the select number density is in the range of 1 to 40 per meter.

Clause 26 of the present disclosure extends to:
The method according to clause 25, wherein the select number density is in the range of 3 to 10 per meter.

Clause 27 of the present disclosure extends to:
The method according to any of clauses 19-26, wherein the ink stream has a diameter DS in the range 20 µm≤DS≤5000 µm.

Clause 28 of the present disclosure extends to:
An optical fiber marking apparatus for marking an optical fiber having an outer surface, comprising relative to a fiber path:
- a payout module and a take-up module respectively configured to pay out and take up the optical fiber while moving the optical fiber over the fiber path at a fiber speed;
- a marking unit disposed downstream of the payout module and at a marking location, the marking unit configured to form an ink stream adjacent the fiber path; and
- a fiber positioning device operably disposed relative to the marking unit and that is adapted to periodically position the optical fiber to intersect the ink stream so that ink from the ink stream forms spaced apart marks on the outer surface of the optical fiber at the marking location.

Clause 29 of the present disclosure extends to:
The optical fiber marking apparatus according to clause 28, wherein the fiber positioning device comprises a roller having a perimeter and at least one position adjustment feature at the perimeter.

Clause 30 of the present disclosure extends to:
The optical fiber marking apparatus according to clause 29, wherein the roller comprises a circular roller having a circular perimeter, and wherein the at least one position adjustment feature comprises at least one protrusion.

Clause 31 of the present disclosure extends to:
The optical fiber marking apparatus according to clause 29, wherein the roller comprises an eccentric roller having an eccentric perimeter portion that comprises the at least one position adjustment feature.

Clause 32 of the present disclosure extends to:
The optical fiber marking apparatus according to any of clauses 28-31, wherein the fiber path is substantially perpendicular to the ink stream.

Clause 33 of the present disclosure extends to:
The optical fiber marking apparatus according to any of clauses 28-32, wherein the ink stream has a diameter DS in the range 20 µm≤DS≤5000 µm.

Clause 34 of the present disclosure extends to:
The optical fiber marking apparatus according to any of clauses 28-33, wherein the optical fiber has a diameter DF and the ink stream has a diameter DS in the range $(0.5) \cdot DF \leq DS \leq 10 \cdot DF$.

Clause 35 of the present disclosure extends to:
The optical fiber marking apparatus according to clause 34, wherein $DF \leq DS \leq 5 \cdot DF$.

Clause 36 of the present disclosure extends to:
The optical fiber marking apparatus according to any of clauses 28-35, wherein the marks are formed as wet marks, and further comprising:
- a dryer unit configured to dry the wet marks to form dried marks.

Clause 37 of the present disclosure extends to:
The optical fiber marking apparatus according clause 36, further comprising:
- an overcoating system disposed downstream of the dryer unit and configured to coat the dried marks and the outer surface of the optical fiber.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of marking an optical fiber having an outer surface, comprising:
   - forming from ink an ink stream;
   - moving the optical fiber over a fiber path that resides adjacent the ink stream; and
   - periodically changing the position of the fiber path so that the optical fiber at least partially enters the ink stream so that the ink forms spaced apart marks on the outer surface of the optical fiber.

2. The method according to claim 1, wherein the optical fiber at least partially entering the ink stream comprises the optical fiber passing through the ink stream in a first direction and passing back through the ink stream in a second direction opposite to the first direction.

3. The method according to claim 1, wherein said periodically changing comprises pushing the optical fiber with at least one position adjustment feature at a perimeter of a rotating roller.

4. The method according to claim 3, wherein the rotating roller has a generally circular shape with the perimeter and wherein the at least one position adjustment feature comprises a protrusion at the perimeter.

5. The method according to claim 3, wherein the rotating roller has an eccentric shape and wherein the at least one position adjustment feature comprises an eccentric portion of the perimeter.

6. The method according to claim 1, wherein the marks have an axial length between 1 mm and 10 mm.

7. The method according to claim 6, wherein the marks have a center-to-center spacing of between 5 mm and 500 mm.

8. The method according to claim 1, wherein the marks are initially formed as wet marks, and further comprising drying the wet marks to form dry marks.

9. The method according to claim 8, further comprising forming a protective overcoat over the outer surface of the optical fiber and the dry marks.

10. The method according to claim 1, wherein the moving of the optical fiber over the fiber path includes moving the optical fiber at a line speed of at least 10 meters per second.

11. The method according to claim 1, wherein the ink stream flows continuously while forming at least two of the spaced apart marks.

12. The method according to claim 1, wherein the ink stream has a diameter DS in the range 20 µm≤DS≤5000 µm.

13. The method of claim 1, wherein the marks are wet marks and the method further comprises:
drying the wet ink marks at a drying location to form dried ink marks; and
applying a substantially transparent protective coating over the dried ink marks and the outer surface of the optical fiber, wherein the dried ink marks are visible through the substantially transparent protective coating.

14. The method of claim 1, wherein before the periodically changing, the ink stream flows past the fiber path.

15. The method of claim 14, wherein after the forming spaced apart marks, the ink stream flows past the fiber path.

16. The method of claim 1, wherein the periodically changing comprises two incursions of the optical fiber into the ink stream to form at least two marks and wherein the ink stream comprises a flow that is continuous for at least a time required for the two incursions.

17. The method of claim 1, wherein the marks are ring marks that extend all the way around a circumference of the optical fiber.

18. The method of claim 1, wherein the ink stream has a diameter DS and the optical fiber has a diameter DF such that the ink stream diameter DS is at least as large as half of the fiber diameter DF.

19. The method of claim 1, wherein the diameter DS and the diameter DF are such that DF≤DS≤5·DF.

20. The method of claim 1, further comprising collecting ink from the ink stream that is not used to form the spaced apart marks.

21. An optical fiber marking apparatus for marking an optical fiber having an outer surface, comprising relative to a fiber path:
a payout module and a take-up module respectively configured to pay out and take up the optical fiber while moving the optical fiber over the fiber path at a fiber speed;
a marking unit disposed downstream of the payout module and at a marking location, the marking unit configured to form an ink stream adjacent the fiber path; and
a fiber positioning device operably disposed relative to the marking unit and that is adapted to periodically position the optical fiber to intersect the ink stream so that ink from the ink stream forms spaced apart marks on the outer surface of the optical fiber at the marking location.

22. The optical fiber marking apparatus according to claim 21, wherein the fiber positioning device comprises a roller having a perimeter and at least one position adjustment feature at the perimeter.

23. The optical fiber marking apparatus according to claim 22, wherein the roller comprises a circular roller having a circular perimeter, and wherein the at least one position adjustment feature comprises at least one protrusion.

24. The optical fiber marking apparatus according to claim 22, wherein the roller comprises an eccentric roller having an eccentric perimeter portion that comprises the at least one position adjustment feature.

* * * * *